United States Patent [19]

Kantor

[11] Patent Number: 4,546,649
[45] Date of Patent: Oct. 15, 1985

[54] INSTRUMENTATION AND CONTROL SYSTEM AND METHOD FOR FLUID TRANSPORT AND PROCESSING

[76] Inventor: Frederick W. Kantor, 523 W. 112th St., New York, N.Y. 10025

[21] Appl. No.: 423,570

[22] Filed: Sep. 27, 1982

[51] Int. Cl.[4] .......................................... G01M 19/00
[52] U.S. Cl. ...................................... 73/168; 73/726; 73/730; 340/870.11; 340/870.19
[58] Field of Search ...................... 340/870.11, 870.19, 340/825.21; 73/168, 730, 726; 370/100

[56] References Cited

U.S. PATENT DOCUMENTS

| | | | |
|---|---|---|---|
| 2,420,148 | 5/1947 | Ostergren | 73/730 |
| 2,739,301 | 3/1956 | Greenfield | 340/870.19 |
| 2,747,408 | 5/1956 | Boytim | 73/730 |
| 3,149,492 | 9/1964 | Weinberg | 73/730 |
| 3,467,013 | 9/1969 | Connor | 405/171 |
| 3,737,858 | 6/1973 | Turner et al. | 340/870.19 |
| 4,413,259 | 11/1983 | Lutz et al. | 340/870.11 |
| 4,420,980 | 12/1983 | Dunemann et al. | 73/730 |

FOREIGN PATENT DOCUMENTS 0074574 9/1982 European Pat. Off. .............. 73/730

Primary Examiner—Charles Frankfort
Assistant Examiner—Thomas B. Will
Attorney, Agent, or Firm—Gregor N. Neff

[57] ABSTRACT

A system and method for measuring and controlling the parameters and conditions of a thin-wall submersed-tube fluid transport system called an "equiduct" system. The tube or tubes preferably are located near the bottom of a water artery such as a river, and are in fluid equilibrium with the surrounding water. This permits the tubes to have relatively thin, flexible walls, which makes the tubes relatively inexpensive and easy to install. Simple pumps cooperate with the slope of the river bed in pumping fluids through the tubes. Parameters such as fluid pressures and velocities, depth, gas and liquid concentrations, etc. are measured at spaced locations in the tubes, and the measurements are delivered to a central data processing and control station so that the parameters can be adjusted, or the need for repairs in the tubes can be detected and the repairs can be made. Preferably, in a long equiduct system, the data from separate measurement stations along the system, are transmitted over a common communication line to the central station. A clock source transmits a series of digital identification words with blank spaces after the identification words. When each station detects its identification signal, it fills the subsequent blank space with data, which then is carried to the central station.

12 Claims, 9 Drawing Figures

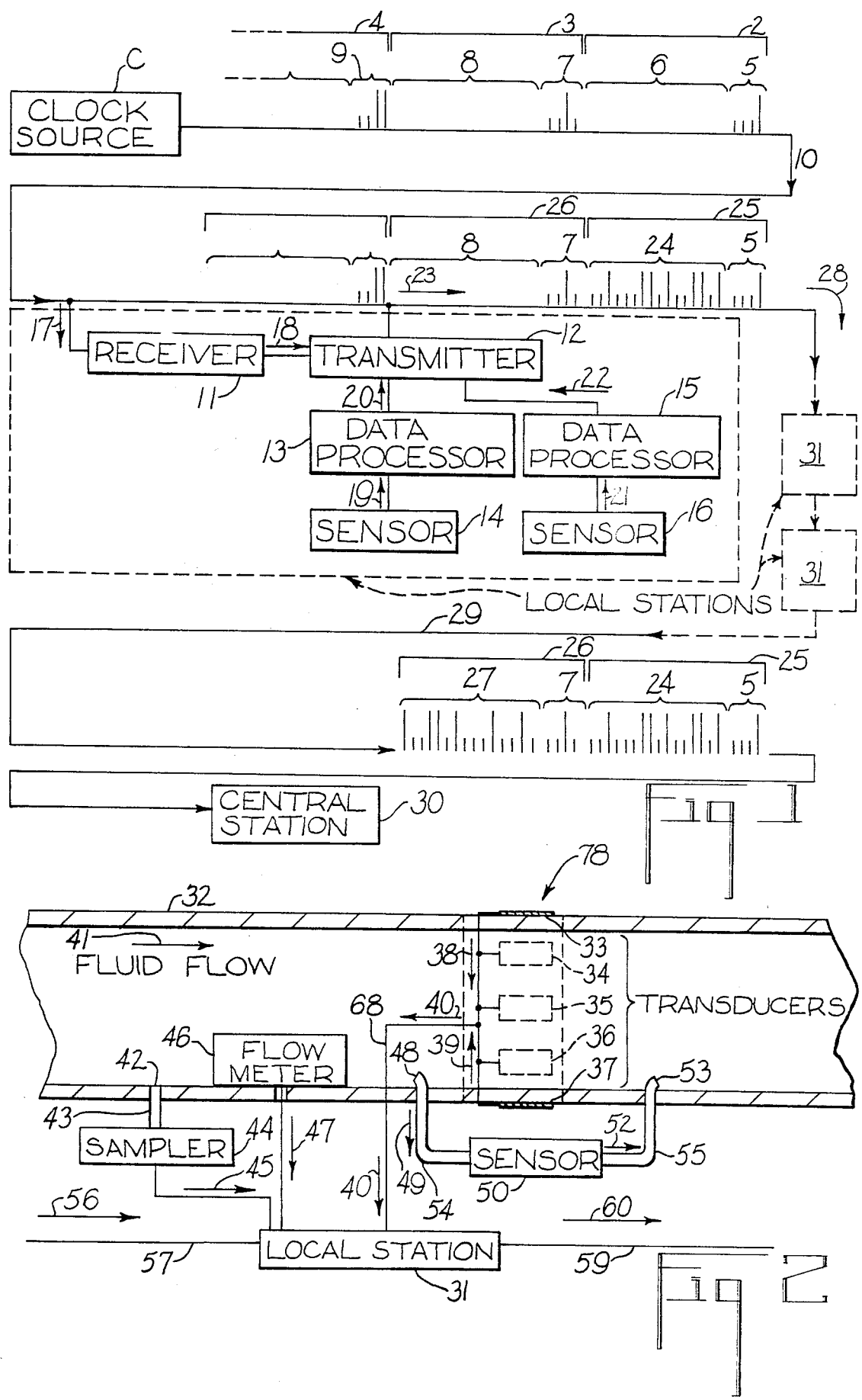

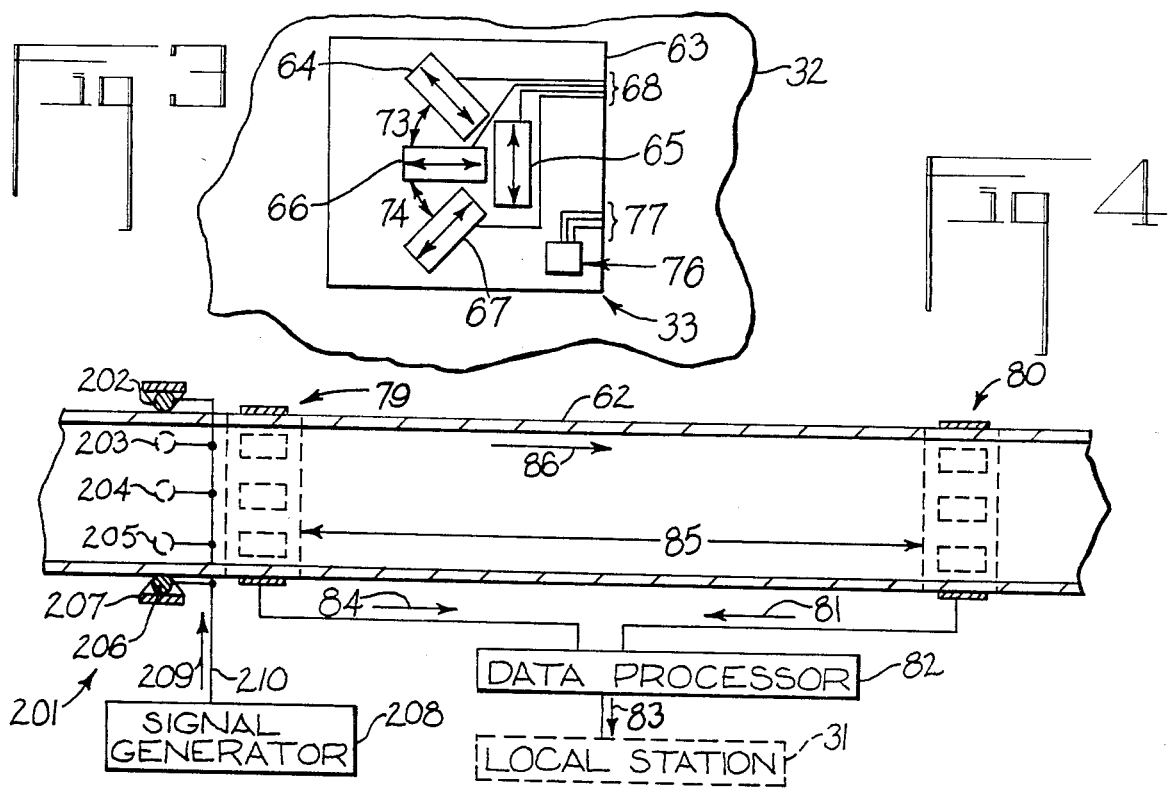
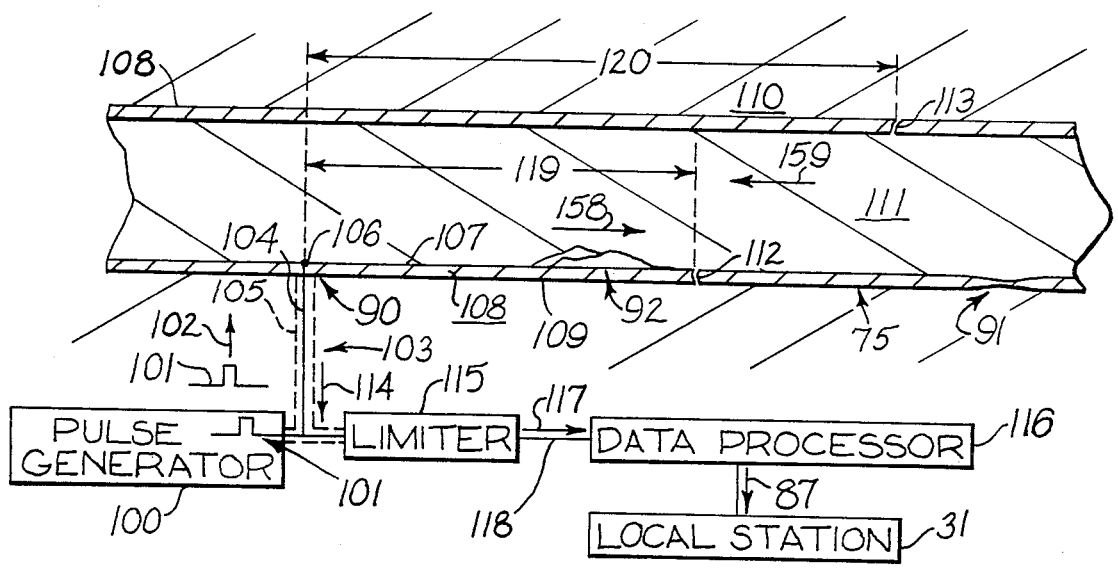
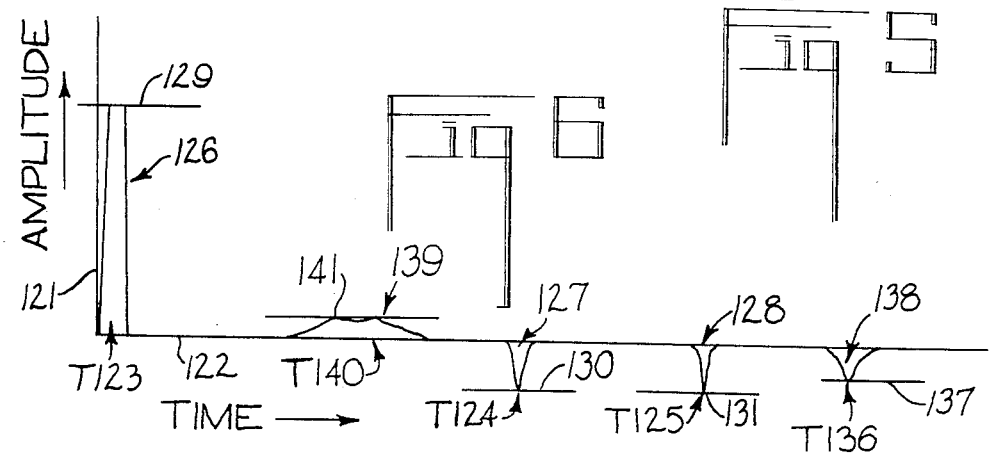

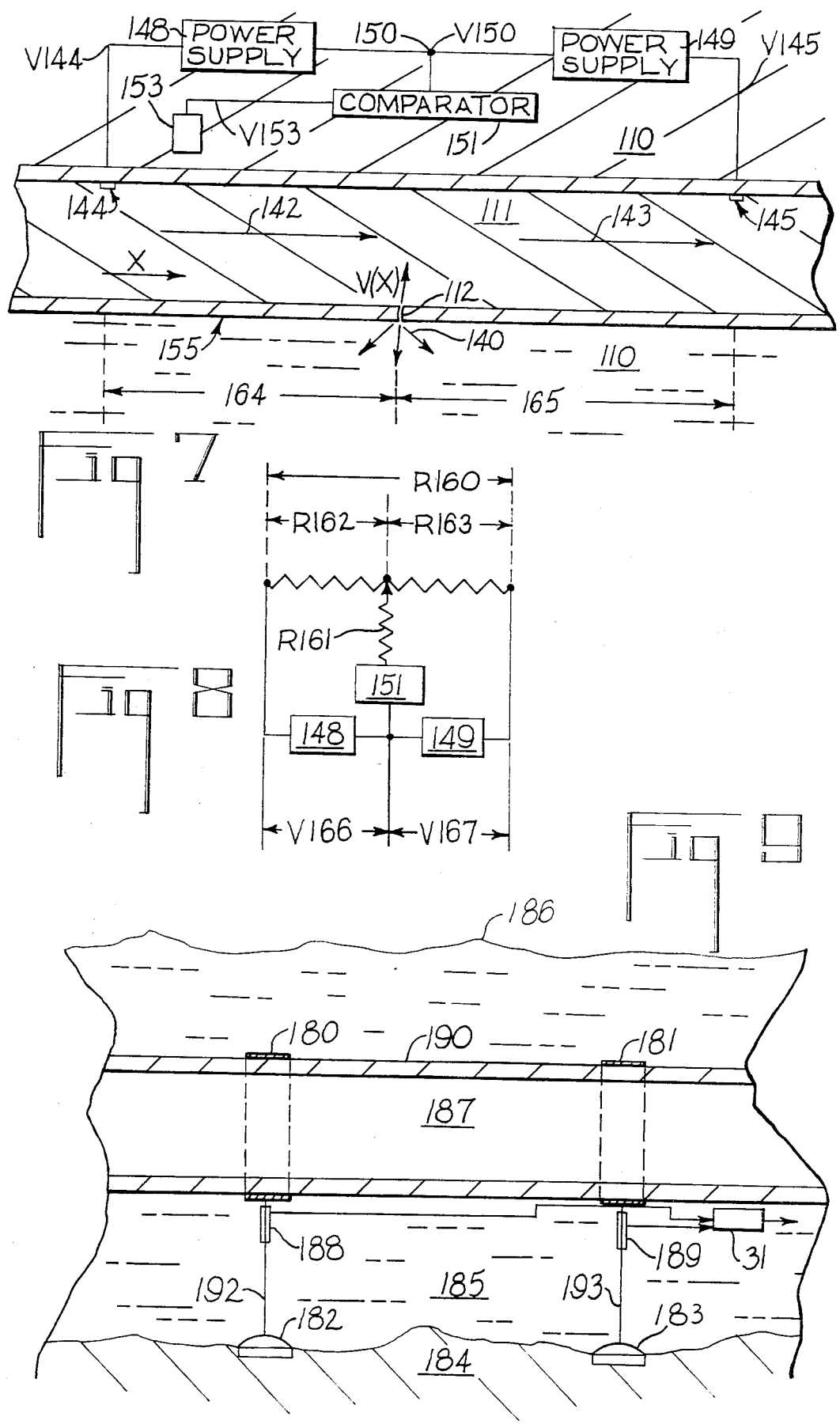

INSTRUMENTATION AND CONTROL SYSTEM AND METHOD FOR FLUID TRANSPORT AND PROCESSING

I. FIELD OF THE INVENTION

This invention relates to instruments and procedures for measuring properties of conduits and related apparatus: more specifically, this patent application is related to methods and apparatus for measuring the dynamic and static characteristics, and the operation of flexible thin-wall conduits, ponds, vessles, and related apparatus.

In my co-pending patent applications all filed Sept. 27, 1982, and entitled: Fluid Transport Conduit System in Equilibrium With Its Environment, Ser. No. 423,524, now U.S. Pat. No. 4,469,596, Sept. 4, 1984, (hereinafter referred to as *1); Fluid Transport Conduit System in Equilibrium With Its Environment: Conduit Configuration, Ser. No. 423,781 (hereinafter referred to as *2); Apparatus and Method for Processing Wastes, Ser. No. 423,782 (hereinafter referred to as (4); and Fluid Transport and Processing System and Method, Ser. No. 423,522 (hereinafter referred to as *5), I describe thin-wall conduits for carrying fluids while submerged in and in equilibrium with a liquid body such as a river, sea or lake. Such conduits are called "equiducts". The descriptions of those co-pending applications hereby are incorporated herein by reference. The specific disclosures in those applications include safely flow-augmented equiducts and dynamically stable equiducts, equiponds, equipods, and systems utilizing various of these structures alone or in combination to store and transport fluids.

II. OBJECTS OF THE INVENTION

It is an object of the invention to provide instrumentation systems and methods for the trouble-free and economical operation of an equiduct system. It is a further object to provide such instrumentation which is capable of detecting incipient malfunctions of the system, and requires a minimum amount of human effort in its operation.

III. SUMMARY OF THE INVENTION

The invention is summarized in the Abstract above and in the description which follows.

Means and methods are provided for measuring and controlling parameters such as the amount of flow augmentation (pumping) used in a safely-augmented equiduct system; the amount of internal pressure, the amount of buoyancy, and other properties of these systems and their operation. Depending on the variety of functions to be performed within the system, measurements of various properties might be needed for one system for its operation, but might be of only research interest for another system, or for a third system be of interest in analyses of function and performance directed towards preventive maintenance. These three broad classifications: operating information inputs, preventive maintenance inputs, and research information inputs, can be used to characterize various kinds of information and methods and apparatus for obtaining it with respect to each specific system.

After information has been sensed, it is typically desirable for overall system analysis and operation to gather at least portions of this information in a central place. Because of the large size of certain classes of systems based on these equiducts, for example, systems for collecting sewage from an entire river valley, the electronic signal propagation delays associated with collection of information from the more remote sensors can be quite substantial, amounting to many hundred of times the amount of time required for the transmission of the information itself. For this reason, a system which reduces the effect of these delays substantially will be discussed. In the following discussion I will list and outline briefly methods and apparatus for measuring each of a variety of properties of these systems.

A. DEPTH

In accordance with the present invention, the depth at which an equiduct operates can be represented by three different parameters. These parameters are the distance below the top of the liquid in which the equiduct is situated; the distance above the bottom of the liquid; or the pressure experienced externally by the equiduct. The first of these measurements can be implemented by the use of a float and cable system which actuates a transducer. Also, it can be implemented by use of a sonar transmitter and receiver located in a small container attached or anchored to the equiduct. This can be a simple sonar mechanism which reflects a sound wave from the upper surface of the ambient liquid in which the equiduct is located.

The second parameter, the distance from the bottom of the liquid, can be measured by the use of a sinker which rests upon the bottom of the river or other body of water, a cable connected to the sinker; and a transducer mechanism which records the amount of cable which has been paid out or reeled in. Alternatively, sonar can be used, with impulses reflected from the bottom of the body of liquid in which the equiduct is located.

Measurement of the effective pressure external to the equiduct can be done by means of gauges with transducers, of which many are known in the art. Among those which are known and which can be utilized in conjunction with suitable transducers for remote measurement are bourdon tubes, strain gauge transducers, including semi-conductor strain gauges, bellows transducers, capacitive pressure transducers, etc.

Note that the results of these three types of measurement are not necessarily the same. For example, the pressure at the bottom of a tidal estuary which is fed by a fresh water stream varies both with the tide and with the salinity of the water. Under such circumstances, a measurement of the distance to the surface and a measurement of the depth as represented by the water pressure (the "pressure depth") would not be equivalent.

B. PRESSURE DIFFERENCE ACROSS EQUIDUCT WALL

The pressure difference between the inside and the outside of a submerged equiduct has two different components: one is the static difference as measured by a transducer which does not deflect or appreciably interfere with the flow of fluid within the equiduct; the other is a parameter which includes the contribution of "stopping pressure" of the moving fluid.

The static pressure difference can be measured by using a pressure gauge with a suitable port connected through the wall of the equiduct. The gauge pressure is the difference between the pressure within the equiduct and the pressure ambient to it.

A second method of measuring the static difference in pressure is by measuring the strain in the equiduct wall in the transverse direction. This strain may be subject to creep over a prolonged period of time because of changes in the material of which the wall is constructed. For this reason, strain in the wall itself may be a measurement which is useful over short time spans, but might not be reliable with various materials of construction for the wall, as a stable measurement over prolonged periods of time. Under such circumstances, where the wall of the equiduct is made of a material which can experience creep, a belt can be placed around the equiduct in contact therewith, and a strain gauge coupled to that belt. The belt is made of a material with reproducibly-defined characteristics of creep and aging. The measurement of strain within the belt material could be used to characterize pressure within the equiduct.

A third method of measuring the static difference and one which was used as an illustration of a control principle in my co-pending application *1, is to introduce a small transverse deflection in the equiduct wall and measure the force with which the wall resists deformation. This measurement is characterized by contributions both from the static pressure difference between the fluid within and without the equiduct, and also by contributions associated with changes in the flow pattern of the fluid flowing within the equiduct. This second class of contribution is discussed more fully in connection with formation of equiduct walls in my co-pending patent application *2 and is generally a consequence of what is known as the Bernoulli effect.

Measurements specifically including the contribution to pressure of the kinetic properties of the fluid within the equiduct (the "stopping pressure") can be made using a Pitot tube. In this case, the "stopping pressure" of the fluid within the equiduct can be measured directly as the gauge pressure between the inside of the equiduct and the outside of the equiduct. This is related to a measurement of the velocity of the fluid. Such a measurement, for example, could be made of a comparison of gauge pressure between the stopping pressure at the Pitot tube and the pressure measured without substantial interference with the flow of fluid in the equiduct, with gauge reference being made to pressures external to the equiduct.

C. FLUID VELOCITY

As mentioned above, a Pitot tube can be used in measuring fluid velocity within the equiduct. This requires a knowledge of the nature of the material flowing within the equiduct, such as, for example, its density. However, for many purposes small variations in the density would not lead to errors large enough to require a substantial change in the calibration of the Pitot tube.

A second technique by which velocity measurements can be made is by use of nuclear magnetic resonance. In such a measurement, suitably oriented hydrogen nuclei are observed as they move downstream within a magnetic field. Such techniques have been used, for example, in measuring the flow of liquid within intact blood vessels.

A third technique detects induced electromotive forces (e.m.f.'s) when fluid within the equiduct passes through a known magnetic field. This requires that the fluid within the equiduct not be an insulator. Typically, there will be many applications in which this requirement is satisfied. By using a high electrical input impedance in the electrode circuitry associated with the detector for the e.m.f.'s, the sensing of fluid velocity can be made relatively independent of the electrical conductivity of the fluid. For example, ordinary water is a sufficiently good conductor to allow such measurements to be made.

A fourth technique utilizes a small propeller which is driven by the flow within the equiduct. The rate of rotation of the propeller is measured to measure the velocity of flow of the fluid. This propeller can actuate a simple tachometer. Such a technique is quite commonly used for measuring fluid velocity. In some cases, the propeller might advantageously be designed to shed debris, using, for example, a shape similar to that described for shedding debris in flow augmentation means, in my co-pending application *1.

A fifth technique which has been utilized for measuring fluid velocities is vortex shedding. An object with a geometric configuration which will produce turbulent vortices is introduced into a flowing fluid. The frequency with which such vortices are shed is a measure of the velocity of flow of the fluid. These vortices are allowed to pass a pressure sensor which senses the local pressure. This can be thought of as a fluid dynamic microphone. It measures the brief fluctuations in pressure associated with the passage of vortices, amplifies a signal produced thereby, and allows it to be recorded by means of an electronic counter which measures the frequency with which the vortices are shed. This then corresponds to a velocity measurement.

A sixth technique for measuring fluid velocity is to transmit acoustical impulses within the fluid in the upstream and downstream directions, and measure the variation in time delay associated with propagation in the two different directions. This can be used with suitable electronic timing devices to obtain an accurate measure of the velocity of flow of the medium within which the acoustic waves propagate. The time required for the acoustic signal to move with the stream from an emitter to a detector is smaller than the time required for the acoustic impulse to move against the stream the same distance. One emitter can be used with a pair of detectors, or some other suitable combination can be utilized.

D. GAS FRACTION WITHIN FLUID IN EQUIDUCT

The amount of gas carried within the liquid in an equiduct can have significant effects upon the buoyancy, compressibility, and pumping requirements for the operation of an equiduct system. One measure of the amount of gas, which usually takes the form of small bubbles swirling within the liquid, is the velocity of propagation of an acoustic wave whose wavelength is substantially longer than the mean distance between bubbles within the liquid. This is because a gaseous component has a substantially different modulus of compressibility than the liquid component. The average modulus of compressibility of a composite of liquid and gas then determines the velocity of propagation of the acoustic wave. This corresponds to a dynamic compressibility measurement. Compressibility can be measured also by other techniques. By such methods the gas fraction in an equiduct can be measured.

E. VELOCITY OF TRANSPORT OF GAS

A gaseous phase transported within a liquid phase within an equiduct may not move with the same velocity as does the liquid phase. This is especially the case within an extended system, in which there may be a tendency for gas to "hang-up" at various places. In order to determine whether such gas hang-up has occurred, and in order to measure the velocity of flow of gas within an equiduct system, various tracer techniques can be utilized. A stable isotope of gas which is normally present within the equiduct can be introduced. This isotope should be selected so as to be relatively rare in the natural gas otherwise transported within the equiduct. The presence of this isotope can then be detected by a spectrometer located at a sampling or monitoring station further down the equiduct stream.

A second technique is to introduce a gas which is relatively insoluble in the liquid transported in the equiduct, and easily identified, for example by spark spectrophotometry or by infra-red absorption, or some other convenient technique. An example of this would be to introduce an inert gas such as helium or krypton, or a relatively stable synthetic gas, such as, for example, a fluorinated hydrocarbon.

F. GAS COMPOSITION

The composition of gas within an equiduct can be significant in determining its effect upon the materials of construction thereof, and in anylyzing its origin. For example, an equiduct which is carrying biological materials may have fermentation processes occurring within it which give rise to various gaseous products. Gas composition can be measured by sampling and testing. Various testing techniques are well known in the art, such as gas chromatography, mass spectrography, spectroanalysis, solution in various electrolytes which are responsive to various gases, polarigraphy of a dissolved solution of the gas, and infra-red absorption spectrophotometry. Specific techniques are available which are sensitive to the presence of various materials in solution, for example, to the partial pressure in solution of oxygen.

G. FLUID COMPOSITION

Fluid composition can be determined in several ways. It can be determined on a continuous basis with respect to various components for which instrumentation exists. Among measurements which can be performed continuously are measurements of pH, electrical conductivity, detection of specific ions by means of sensitive electrodes, infra-red absorption for detection of various molecular types, and so forth.

Among techniques which can be utilized with sampling and testing are gas chromatography, mass spectrometry, spectronanalysis, solution in various materials with analysis of spectra, or analysis of means of polarigraphy.

A third class of tests which can be performed is the measurement of solids carried with a fluid. This is not precisely a test of the nature of the fluid itself; however, under many circumstances, solids can be expected to be transported with fluids. Such solid transport can be monitored continuously by measurements of turbidity, and by measurements of various components of the absorption of fluorescent spectrum for incident light. Solid transport can be measured on a sample-and-test basis by removal of the fluid or by centrifugation of the solids, so as to extract the solids separately and make them available for further testing.

H. STRESS, STRAIN, TORSION, AND BEND IN EQUIDUCT WALL

Mechanical deformations of the equiduct wall are of interest both for maintaining the operational parameters of the equiduct within desired boundaries, and also for studying the properties of the materials with a view to preventive maintenance and system analysis. Such measurements can be implemented by strain gauges embedded within or bonded to the wall of the equiduct. Because there can be creep in the equiduct, sometimes it may be desirable to have external references, such as collars or bands located around the equiduct, to allow the motion of the equiduct relative to these colars to be measured. Measurement of properties of a reinforced composite equiduct wall could advantageously include measurements parallel to each of the fiber orientations, so as to measure the amount of strain occurring in the variously oriented reinforcing fibers. Measurements might reasonably be made transverse to and parallel to the axis of the equiduct. Also, measurements on a bias to the axis of the equiduct, biased in the positive and negative helicity senses, that is, like a right-hand or a left-hand screw, could be useful in measuring torsion in the equiduct wall. By locating such strain gauges spaced around the periphery of the equiduct wall, it becomes possible to measure differences in strain at different portions of the equiduct. This allows measuring a bend in the equiduct as a whole which would correspond, under some circumstances, for example, to an increase in the strain in the wall furthest from the center of the bend and a decrease in strain in the wall closer to the center of the bend, relative to each other. By placing such sets of strain gauges at locations spaced axially along the equiduct wall, wave properties of the equiduct would also be readily determinable. This is discussed further in connection with surface waves. Snaking displacements would tend to show on suitably-placed bias-oriented strain gauges.

I. CREEP IN THE EQUIDUCT WALL

The measurement of creep in an equiduct wall under prolonged operation at relatively high stresses can be a significant measurement in preventing creep failure. Such a measurement can utilize belts or collars located outside of the equiduct as reference for such a measurement. Alternatively, suitable strain measuring devices with long term stability adequate to allow the measurement to be made without external reference might be included within the wall of the equiduct.

J. DEBRIS TRANSPORT WITHIN THE EQUIDUCT

The velocity of transport of various types of debris within the equiduct can be relevant to determinations of transport properties for the transport of solid material within an equiduct. Depending upon the nature of the material, various processes for tracing such material can be utilized. For example, if some of the material which is transported within the equiduct is ferromagnetic, a portion of that material can be magnetized as a pulse, introducing into the equiduct effectively a tracer which moves with the material otherwise transported. One would expect that variations in the size and nature of the material particles transported would give rise to a dispersion in this transport phenomenon. For this reason, the material which was magnetized at one location, in a brief time, could be expected to arrive at locations further downstream over a more extended period of time. The time delay between the magnetization of material and the arrival of these components at a suitable detecting station downstream gives the velocity of propagation within the equiduct for these various components. In some cases, it could be possible to extrapolate from these different velocities of propagation to determine the behavior of materials which are moving with the magnetized material but which themselves did not acquire the small magnetic field by which the other is detected.

For more detailed studies of the transport of non-magnetic material, suitable tracer material can be introduced. This tracer material may be tagged with dyes which fluoresce, or with other suitable means for identification.

It is interesting to note that a pulse of slurry introduced within an equiduct utilized for the transport of slurry would display, under ordinary circumstances, a dispersion in the velocities of transport for its various components. This dispersion can be utilized in analyzing the behavior of the equiduct with respect to the various components, and the amount of loading with material of each type that it can tolerate while still performing effectively. Such types of measurements could be especially interesting in systems which utilize equiducts for the transport and removal of solid wastes, for example from municipalities along a river valley.

K. STIRRING OF MATERIAL IN EQUIDUCTS

Stirring of material flowing within the equiduct can be of value to prevent the settling out or the rising to the top of debris transported with the fluid within an equiduct. Also, such stirring can prevent the separation of a gaseous phase which might hang up in places and reduce the effectiveness with which the equiduct transports liquid by reducing the conduit cross-section available for such transport. Because stirring involves a relative motion of various components of the material within the equiduct, and because it is of interest primarily where there is a material different in its properties from the liquid primarily being transported, such stirring can be measured by the scattering of acoustic waves reflected from the material within the equiduct. The reflections of acoustical waves of a single frequency off material swirling within the equiduct would have a dispersion or spread of frequencies. The spread in frequency, in turn, characterizes the amount of stirring activity occurring within the equiduct.

L. SETTLING OUT

Material transported in a fluid medium within an equiduct may have a tendency to settle to the bottom of the equiduct if it is more dense than the fluid carrying it, or rise to the top if it is less dense. This can cause a reduction in the effectiveness of transport of such suspended material. Also, when that material remains upon the upper or lower surface of the equiduct, its presence there reduces the cross-section available for the flow of fluid within the equiduct, and can also increase frictional effects tending to hinder that flow. Presence of such material within the equiduct also can change the net buoyancy of that region of the equiduct plus its contents. This can be used as an indication of the presence of such material in the event that the equiduct is constructed so as to have essentially neutral buoyance under normal operating conditions, and if the equiduct is supported in such a way as to allow the variation of buoyancy to be detected.

A second effect is that there would be a variation in the debris transport velocity for the type of debris which was accumulating. This is discussed more fully in sub-paragraph J above.

The detection of frictional effects is an additional way in which such debris might be detected. These three techniques are appropriate to the detection of accumulation of non-magnetic and magnetic forms of debris. In the event that there is debris of a magnetizable nature, accretions of magnetized debris containing particles which had been magnetized elsewhere in the system might be readily detected by their magnetic nature. Also, the magnetizability of such material might allow it to be detected by its effect upon a nearby magnetic field. For example, flux gate magnetometers or rubidium magnetometers could be utilized in conjunction with a relatively stable magnetic field, e.g. the earth's magnetic field, so that the induced magnetic dipole of the ferro-magnetic debris accumulated within a portion of an equiduct might be detected by its effect upon the steady magnetic field.

Other means for detecting debris depend upon the degree to which the walls of the equiduct have uniform qualities, for example, for transport of surface waves. The presence of debris might then be detected by injecting a surface wave and measuring the mechanical impedence displayed by the mass of the wall, together with the mass of a type of debris which might be tightly coupled to it. This type of effect might be significant, for example, in a conduit system processing water containing minerals which might have a tendency to precipitate out on the walls as hard deposits.

M. LEAKS

Because, under normal operating circumstances, the internal pressure in an equiduct is higher than ambient, the direction of flow of material in the event of a leak would be from within the equiduct to outside the equiduct. For many applications, small quantities of such leakage would have negligible effect. However, if the equiduct is carrying a noxious material, such as sewage, within a body of liquid to be protected from that noxious material, such as fresh water stream, then detection of quite small quantities of leakage would be quite desirable. Typically, there would be little objection to adding a relatively harmless and easily detected tracer material to such noxious material. An example of such a tracer would be a fluorescent dye, for example, fluorescene. Another, if detection were expected from unequipped people, might be a substance having a strong smell, e.g., butyl mercaptan.

A second class of means for detection of leakage from within an equiduct to outside an equiduct is electrical. If the equiduct has a wall which is made of an electrically insulating material, then detection of leakage between a relatively conductive internal fluid and a relatively conductive external fluid can be accomplished by detecting the presence of an electrical junction between these two fluids. This can be done in two substantially different methods, characteristic of two substantially different frequency domains for the signals used.

In the first method, in which essentially direct current is used, a bridge effect can be utilized to establish the relative position between two stations at which the junction between fluid within the equiduct and fluid external to the equiduct has occurred. This junction can be thought of as being the movable contact on a potentiometer whose current carrying element can be either the fluid within the equiduct of the fluid external to the equiduct. Variations on this procedure are utilized in cable fault location in electrical work.

A second procedure using electrical detection is possible if the wall of the equiduct is a dielectric, and has sufficient uniformity so that the fluid within the equiduct and the fluid external to the equiduct can together be regarded as comprising the inner and outer conductors of a coaxial cable. A high frequency electromagnetic pulse transmitted along this coaxial cable would experience a small reflection at the region where there was a junction between the internal and the external media. This reflection would then return along the equiduct, and its time lag, between transmission of the original pulse and reception of the echo, can be used to localize the source of the echo, that is, to localize the junction between the internal and the external media. By detecting multiple echoes at differing time lags, a series of faults can be detected without interfering seriously with the detection of other faults. This technique is known and is utilized in cable maintenance. It is generally referred to, in certain of its applications, as time domain reflectometry. The presence of electrically conductive reinforcing cords in the wall of the equiduct may not necessarily interfere with utilization of a technique of this form. Such cords can be regarded as converting the equiduct from being a simple coaxial structure into a coaxial structure with additional magnetic permeability. This additional magnetic permeability can reduce the velocity of propagation of the electromagnetic wave in the coaxial structure. Also, presence of such material may introduce additional damping of the electromagnetic wave, reducing the effectiveness of this technique for detecting echoes reflected at an appreciable distance from the signal origin station.

N. BREAK IN DUCT WALL EXPOSING ELECTRICALLY CONDUCTIVE CORD

For many applications in which high strength equiduct is desired, metal may be desirable as a reinforcing fiber. This metal material would typically be constructed in such a way that it is electrically conductive throughout a reinforcing cord structure in the wall of the equiduct. The electrical conductivity of this material, together with electrical conductivity, albeit slight, of the fluid inside of or surrounding the equiduct, would allow relatively small breaks in the wall between the cord and the inside, or the cord and the outside of the equiduct to be detected electrically. The methods used would be similar to those discussed in connection with detection of leaks electrically. In the low-frequency domain, the distributed resistance of the cord in the equiduct wall will cause the voltage to vary along the length of the equiduct between two stations, when a current is passed through the equiduct between the stations. The junction between the fluid, internal or external to the equiduct, and this cord establishes a relative potential, between the system providing the current through the equiduct and the fluid contacting it through that junction. This potential can be measured, and its value used to locate the junction between the fluid and the conductive cord.

In the high-frequency domain, the electrically conductive cord can be regarded as one conductor of a coaxial cable. The other conductor is the fluid either inside or outside of the equiduct. In this way, time domain reflectometry might be utilized for the detection of multiple faults by the measurement of the time delay of multiple return echoes from a pulse emitted from a suitably placed emitter on the equiduct. Detection of such incipient failure of the equiduct can be useful for preventive maintenance.

The reinforcing cord itself might, under some circumstances, be protected against adverse effects from its internal or external environment by being maintained at a potential different from that of its environment. The localized electric field that would appear at a fault, could be used to pinpoint the specific fault after its more general location in the equiduct had been found by other means. This same comment applied also to the localization of leaks as described in the above sub-paragraph M. For example, a repair crew could use a device which, when immersed in the fluid surrounding the equiduct, would respond to the electric field or current associated with the current flowing through the leakage path.

O. LEAKAGE IN ELECTRICAL SYSTEMS

For many applications, an equiduct system would have an electrical system as part of its operating, maintenance, or research equipment. Such an electrical system may be used for data gathering, for control, for power distribution, or for a combination of such uses. For example, in a flow augmented equiduct system, power would be provided to actuate the electrical flow augmentation means (pumps). An especially convenient way to provide such power is by means of underwater electrical cables. In order to detect faults in the electrical systems, two basic procedures can be used. The first of these involves placing the electrical system in question within a suitable housing to protect it against the environment, and then detecting faults in the housing. For example, a protective housing might be pressurized with a dry gas. A drop in pressure of this gas would signal leakage to the environment. One could then look for bubbles rising in the ambient liquid from such a leak. Alternatively, a housing could be pressurized with a suitable dielectric fluid, bearing an appropriate tracer chemical such as a fluorescent dye.

A second technique consists of looking electrically for a failure in the insulation of the system. For example, the electric pump motors could be provided with simple summing devices (e.g., differential transformers) which look for an imbalance in the current provided to the various windings of the motor. Any imbalance between the current going in and the current coming out could be detected almost independently of the current provided, and could be used to determine the presence of a leak through the insulation from the winding to the ambient medium. This could be a useful preventive maintenance technique. The techniques described previously in connection with localizing leakage paths by means of their electrical properties could be utilized for various aspects of the localization of failures of the housing or insulation of an electrical system. For example, time domain reflectometry might be utilized in location of multiple faults.

P. SURFACE WAVES

In the following discussion, three different methods of detecting surface waves are described.

In the first method, which was discussed previously in sub-paragraph H, strain gauges located on the surface of an equiduct and speced axially along its length are used in detecting the presence of deformations associated with the passage of surface waves.

The second method makes use of the fact that passage of the surface wave is a time-dependent phenomenon, and that accelerations of the equiduct surface are associated with passage of the wave. Such accelerometer can be detected by a relatively simple accelerometer attached to the surface. Such accelerometers can be readily constructed, for example, by connecting a strain gauge measuring system to a flexible support for a proof mass. Acceleration of the accelerometer is detected by detecting the reaction forces presented by the proof mass in the presence of such acceleration. Accelerometers based on electromagnetic and electrostatic measurements of displacement of the body of the accelerometer relative to that of a proof mass can have high sensitivity, and could be of use in the detection of surface waves.

The third method is to provide a collar around the equiduct. The collar serves as a reference with respect to which displacements of the equiduct surface can be measured. Suitable measuring devices, such as strain gauges, attached to appropriate connecting members can be utilized to measure displacement of the surface relative to such a collar. A series of such collars spaced axially along a portion of the length of an equiduct could provide a series of stations at which measurements could be made, from which could be derived information on the velocity of propagation of surface waves. These various techniques provide information both as to the velocity of propagation and the nature of the surface waves.

The stability of the wall of the equiduct depends also upon the degree of damping experienced by surface waves propagating along it. This can be measured by looking for naturally-occurring disturbances, and measuring their propagation characteristics on the surface of the equiduct. In the absence of suitable naturally occurring disturbances, a driving excitation can be provided. For example, a collar could be provided with various transducers for moving the surface of the equiduct according to controlled patterns, so as to launch surface waves into the surface of the equiduct. These could then propagate in the wall of the equiduct both upstream and downstream relative to the flow of fluid within the equiduct. They would subsequently be detectable at suitably located stations. In this way, the properties of the equiduct with respect to the propagation of surface waves could be studied in detail under a variety of operating circumstances.

Q. WALL FATIGUE

Materials subjected to prolonged flexing can display a reduction in strength and increase in likelihood of failure. This is generally described as a fatigue phenomenon. For example, some elastomers, if repeatedly flexed, develop microscopic cracks throughout. Others, when flexed, develop cracks near the surface which in turn, make them more susceptible to attack by a harsh environment.

Depending upon the materials involved and the details of construction, there are several ways in which wall fatigue in an equiduct can be detected. The first of these is by looking for surface cracking. This would be an indication that flexing of the surface material of the wall had occurred to a degree which could be estimated from the amount of cracking observed, the nature of the materials, and the nature of their environment.

A second characteristic associated with certain forms of fatigue is the progressive deterioration of a composite structure associated with bond failure between the matrix and the reinforcing fibers, and with breakage of fibers. This progressive failure is characterized by a change in the modules of elasticity and damping displayed by the composite material. Such a decrease in modulus of elasticity or damping might be observed by creating surface waves whose velocity of propagation and rate of decay depends upon that modulus of elasticity or damping, and measuring their velocity of propagation and decay rate.

A third technique is to look for acoustic spike emission during deformation of the equiduct wall. Such acoustic emission is characteristic of internal microcracking and surface microcracking. For many materials, such acoustic emissions can be detected long before visible cracking has occurred.

Yet another form of measurement of fatigue properties is possible for systems which use an electrically conductive reinforcing fiber. Many materials display a change in electrical resistance associated with work-hardening. This change in electrical resistance can be used to evaluate the amount of lattice defects which have been introduced by repeated stressing of the conductor in question. For example, the electrical conductivity of reinforcing cords between two selected stations in an equiduct might be monitored to look for fatigue in the reinforcing cords.

For equiducts which have transparent or translucent walls, or which have a composite wall utilizing a transparent or translucent matrix, for certain materials of construction, one effect of fatigue of the material is to cause a greater amount of light-scattering to occur during the passage of light through the material. This scattering might be useful as a measure of the fatigue of such materials.

The preceding wall fatigue measuring techniques are all non-destructive. However, under certain circumstances it might be desirable to remove a sample for testing by standard testing techniques, to observe the degree to which its original properties were retained.

R. pH OF CONTENTS AND/OR AMBIENT OF THE EQUIPMENT

There are numerous standard techniques for measuring the pH of fluids. Commercial instruments are available which operate over wide ranges to measure, essentially automatically, the pH of a fluid material. Such instruments can be coupled, as will be discussed later, with suitable telemetry systems to allow remote monitoring of the pH internal and external to an equiduct.

S. OILS AND FATS

For some applications, it may be desirable to measure the transport of oils, fats, or other insoluble materials of a liquid nature within a fluid such as water in an equiduct. For example, where an equiduct is used for the transport of sewage and industrial wastes, this type of information could be useful in controlling the operation of a processing plant for purifying such materials. Many such materials can be measured by collecting them on hydrophobic filters. Such filters are commercially available, for example, from Millipore Corporation.

Another technique for measuring oils and fats present, for example, in water, is to centrifuge the mixture so that distinct layers can be separated and examined further.

Both of the preceding techniques utilize sampling from the equiducts rather than continuous measurement of its contents. Under certain circumstances, a continuous measure might be obtained by measuring the optical properties, e.g. opalescense or light scattering, of liquid transported within the equiduct. However, under many circumstances such a measurement could be less than adequately accurate. The accuracy of such a measurement might be improved by continuously removing a small amount of liquid from the equiduct and emulsifying it, e.g. ultrasonically, to make droplets contained therein more nearly of uniform size. This emulsion could then be measured optically, and subsequently discarded or returned to the equiduct.

T. PRESSURE DROP AND PRESSURE DIFFERENCE FOR PUMP CONTROL

Control, during operation, of the action of flow augmentation means (pumps) within a flow-augmented equiduct system can be effected, based on suitable monitoring of the difference between the internal pressure and the external pressure of an equiduct. Subparagraph B above includes a discussion of pressure measurements. The differential pressure measured between the inside and outside of the equiduct just after the fluid within the equiduct leaves a flow augmentation means can be useful in a control loop controlling the actuating means for the flow augmentation means. Algorithms for the operation of such control loops are discussed more fully in my co-pending patent application *5. Measuring the difference of pressure between the output of a flow augmentation means and its input could be useful in evaluating the performance of the flow augmentation means. Measurement of differential pressure just before the input to a flow augmentation means, between the inside and the outside of the duct, could be useful in evaluating the effectiveness with which a failsafe algorithm for the operation of a safe flow augmented system is being implemented.

U. PUMP POWER

In a flow-augmented equiduct system, it can be desirable to measure the power fed to the flow augmentation means (pumps). This has both technical and economic consequences. The power utilized in actuating flow within a flow augmented equiduct can be a considerable portion of the operating cost for the equiduct system. Partly for this reason, monitoring of this power can be useful in optimizing the operation of the system. For example, algorithms might be included in a central control computer to divide flow among several parallel equiducts so as to reduce the total power consumption. Such an algorithm might have within it constraints to avoid reducing the flow velocity in certain of these equiducts below a level required for the transport of solids therein. In these and other classes of systems, a measurement of pump power could be useful in preventive maintenance, for example, by facilitating detection of fouling of flow augmentation means or deterioration of the surfaces within such flow augmentation means in such a way as to substantially increase drag on the fluid. Such a power measuring system can consist of a simple analog multiplier with a suitable signal conditioning system to facilitate telemetry and remote monitoring.

V. TEMPERATURES OF PORTIONS OF THE SYSTEM

In any extensive system utilizing motors, bearings, electronics, and other power handling equipment, it can be quite desirable for preventive maintenance purposes to measure the temperature at which various portions of the system are operating. Depending upon the temperature range involved, such measurements might be made using resistance thermometers with a positive temperature coefficient, such as platinum thermometers, resistance thermometers with a negative coefficient, such as thermistors, and for particular applications, thermocouples. For example, in measuring the temperature rise of the winding of a motor over ambient, or of bearings over ambient, a configuration using thermocouples can be especially simple because a thermocouple, by its physics, compares the temperature of two different junctions which can be placed at two different locations. Because most of the properties associated with frictional losses would be measured by measuring differential temperatures, thermocouples might prove useful in a variety of applications.

Operating life for various types of electrical equipment and for various types of mechanical equipment can depend upon operating temperatures. For this reason, measurements of operating temperature of systems in use could provide preventive maintenance data, for example, by facilitating calculations of mean time to failure in order to allow more effective selection of replacement interval in a preventive maintenance program. In the case of bearings, knowledge of the operating temperature can allow selection of effective lubricants for use at the desired temperatures.

W. DUCT WALL THICKNESS

Where a duct wall is subjected to abrasion, it can be desirable to measure the amount of duct wall remaining. This can be useful for preventive maintenance. One way to do this is to use the reflection of an acoustic wave from the interface between the inner surface and the fluid contained within the equiduct. Such a measurement could be made by coupling a suitable instrument to the outside of the equiduct. A suitable instrument would be one within launched a defined acoustic impulse into the equiduct material and received back the reflected wave. Because the material contained within the equiduct is a fluid, it is relatively incapable of propagating a shear wave. For this reason, one would expect that there would be a substantial discontinuity in the impedance for the propagation of a shear wave at the interface between the wall material and the inner fluid. For this reason, shear waves may be especially appropriate for accurate measurements of the thickness of the equiduct wall. In the case of a composite wall, it might be difficult to utilize shear waves because of their reflection from reinforcing fibers. In such a situation, a compression wave might be used. For a compression wave, the difference in impedance would be relatively less between the wall and the fluid within the equiduct than would be likely to be the case for a shear wave.

A second type of measurement makes use of the electrical conductivity of a fluid within the equiduct, and measures the amount of wall present by use of its dielectric properties. The wall is made part of a capacitor. The capacitance of this capacitor then depends upon the dielectric constant of the wall and its thickness. By using two such capacitors side-by-side, the instrument can measure the amount of wall thickness without requiring penetration into the duct.

A third technique is to puncture a small hole in the equiduct and use a measuring instrument which carries an appropriate probe, such as, for example, a probe with a hook, to measure mechanically the thickness of the equiduct wall. This might be suitable, for example, where the equiduct wall is made of a material which is self-sealing after puncture, or which can be readily sealed without degrading its physical properties significantly.

X. INNER SURFACE OF DUCT WALL

The inner surface of the duct wall can have a significant effect upon the amount of frictional drag experienced by fluid flowing within the equiduct in a turbulent fashion (characterized as "plug" flow). For this reason, the quality of the inner surface is related to the velocity of flow and rate of flow of a fluid within the equiduct, and in the case of a flow-augmented equiduct system, to the pumping power requirements to provide flow. For this reason, it can be desirable under many circumstances to be able to measure the characteristics of the inner surface of the equiduct wall. This could be done by puncturing the equiduct wall and inserting a suitable optical system. The optical system might be used to study a region of the wall near the puncture, or to reach through the equiduct to another region. The availability of adequately high resolution fiber optical visual systems makes such an inspection relatively simple.

In the case of an equiduct with a transparent wall material, either as a homogeneous wall, or as the matrix for a composite wall, inspection of the internal surface of the wall from outside the equiduct is relatively simple.

For many types of equiduct the diameter of the equiduct would be sufficient to allow a mobile instrument to be inserted within the equiduct, capable of traveling within the equiduct, for instance at the end of a suitable cable, and transmitting through such a cable measurements which it had made upon properties within the equiduct, such as chemical composition, dissolved gases, pH, and optical information acquired through suitable optical pickups. For equiducts utilized in handling sewage from large municipalities, it is quite likely that the internal diameter of the equiduct would be sufficient to allow a person to enter it, to inspect its inner surface, or for other purposes.

Y. TURBULENCE

Turbulence in the fluid flowing within an equiduct gives rise to several effects. One is that the flow within the equiduct becomes characterized as plug flow, in which the velocity of flow parallel to the axis of the equiduct is essentially constant over most of the diameter of the equiduct, and goes to zero at the walls at a region near the walls relatively small compared to the diameter of the equiduct. Changes in the turbulence within the equiduct can change the amount of drag exerted by the walls on the flowing fluid and thereby change the amount of pump power required in an augmented system, or the amount of other pressure head which is required in a system fed by gravity. Such turbulence can give rise to local pressure fluctuations on a small scale. Measurement of such fluctuations offers one method for detecting the presence of such turbulence.

Turbulence in a fluid results also in the variation on a small scale of the velocity of the fluid, both as to direction and magnitude. Acoustic waves propagating within the fluid can be scattered from variations in the mechanical properties of the fluid, such as variations in the direction of flow, because these variations give rise to variations in the effective velocity of propagation of the acoustic wave. For this reason and for other reasons, one can expect that sonar Doppler shift broadening, in which reflected acoustic waves of relatively pure frequency initially are returned with a broader range of frequencies to be a suitable system for measuring some types of turbulence present in fluid flowing within an equiduct.

Z. DENSITY OF EQUIDUCT CONTENTS

As is discussed in detail in my co-pending patent application *2, there are technical and economic reasons why under certain circumstances it could be desirable to monitor the density of the contents of an equiduct, so as to allow this density to be regulated, in order to permit operation of an equiduct in a nearly neutral buoyancy condition. Measurement of this density of the contents can be done by measuring, for example, the buoyance of a portion of equiduct carrying the material in question. Alternatively, a sample can be extracted from the equiduct and its properties measured. The contents in question may consist of liquid, solids, and gases.

For materials within an equiduct which have sufficient homogeneity to allow a meaningful measurement of their density on a small scale, density measurements can readily be made utilizing a combination of volume flow measurement and mass flow measurement, from which combination can be extracted the density of the flowing liquid. For many types of material which would be transported, there is sufficient homogeneity to allow such a measurement to be meaningful; however, when a slurry with relatively large pieces of solid material is transported, such measurements on a small scale may give too large a fluctuation to be useful in determining the mean density of the slurry and liquid together. In such a case, a larger scale measurement, such as would be obtained by measuring the buoyancy of the equiduct carrying the slurry, may be more useful.

AA. HEAT TO DRY A SLURRY

Where solid wastes are transported within an equiduct a favorable energy balance for subsequent processing of the transported solid material can be partly characterized by a measurement of the heat which would be required to dry the slurry in which the wastes are carried. Typically, this would be done most readily by removing samples of the slurry from the equiduct, drying them, and measuring the heat necessary to dry the slurry.

BB. ENERGY CONTENT

Under some circumstances, the material within an equiduct may be characterized usefully by a measurement of its energy content. In the case of sewage, for example, a measurement of the energy content could be useful in determining the amount of biological processing by natural organisms which could be supported by the sewage or required for its treatment. In the case of transport of solid wastes in a slurry, a measurement of the energy content is useful in characterizing the types of steps which can be economically performed upon the slurry.

CC. BIOLOGICAL ACTIVITY

In the case where sewage or other biologically active material is transported within an equiduct, especially when it is transported for an extended time, biological activity can occur within this transported material, leading to the release of by-products. Some of these by-products can be gaseous, such as carbon dioxide and methane. Information as to the biological activity can be useful in selecting the flow velocity at which such biologically active material will be transported within an equiduct. Also, information on biological activity is useful in analyzing the performance and design requirements for equiducts for such applications, as there are relationships between the amount of pumping power required in a flow augmented system, velocity of flow of the material transported, and size of duct used. The ability to utilize one or more branches of an equiduct system in an adjustable manner, for example, by switching among them so as to select conduits of varying sizes, or so as to place conduits in parallel for a larger total cross section, can be implemented to reduce the total pump power so as to reduce the total energy consumption and operating costs for the system. However, when such a reduction in velocity is considered, also the settling of slurries and the effects of biological activity associated with the reduced velocity and increased flow time of the material within the equiduct system should be considered. Such biological activity can most readily be measured by sampling and testing. A sample could be extracted from the equiduct and allowed to undergo suitable fermentation or other processes, and its products measured. For certain types of organisms, biological activity can be measured by selecting wavelengths of ultraviolet, visible or infra-red light which are characteristically absorbed by the micro-organism or micro-organisms responsible for the biological degradation of the material being transported. An assay for the presence of such organisms and their populations can then be performed on a continuous basis by suitable measurements of light passing through a portion of the fluid transported within the equiduct.

DD. TURBIDITY

Measurements of biological activity can be performed partly by measuring the absorption of light within fluid flowing in an equiduct. For certain types of subsequent processing, for example, for processing in equilibrium ponds, as is discussed in my co-pending patent application *4, it can be desirable to measure the depth to which light is expected to penetrate the material which will be within the ponds. Within the zone which is reached by light penetrating from the surface can occur photosynthetic processes. Because these are a major process in the conversion of biological material to other products, the abitlity to control the various operating parameters of the system, so as to be compatible with the depth to which illumination can reach might be useful in improving the yield from such ponds. Also, such information could be important in creating mathematical models for predicting the behavior of such ponds and for relating models to performance. Such turbidity can be measured by measuring the light absorption for light passing through a portion of the fluid contained within the equiduct. This can be measured as a function of the wavelength of the light. For specific applications, filters whose response matches the response of specific photosynthetic steps of various micro-organisms to be utilized for further processing of biological material can be incorporated in a test device, so that the turbidity of the material which is measured correlates closely with the ability of light to reach and sustain organisms of the type in question.

EE. VISCOSITY

Viscosity can be measured by a variety of means, for example, a rotating cylinder can protrude into a portion of relatively slowly moving material from the equiduct, sampled through a suitable port system. The drag upon this rotating cylinder can be measured, e.g. by measuring the power required by an electric motor to spin the cylinder at a constant rate. A simple servo-loop can be utilized to maintain the constant rate. The power measurement then indicates the amount of drag experienced by the cylinder, and becomes, in turn, a measure of the viscosity of the liquid.

FF. SEDIMENTATION RATE

Sedimentation rate and type of material in the sediment, or both rising and falling debris, can be measured on a sampling basis using standard techniques. Time for the measurement can be substantially reduced by centrifuging. Techniques for this are known in the art.

DESCRIPTION OF THE DRAWINGS

FIG. 1 is a schematic diagram of a system of the present invention;

FIG. 2 is a cross-sectional elevation view of an equiduct instrumentation station;

FIG. 3 is an enlarged broken-away view of a portion of the structure shown in FIG. 2;

FIGS. 4 and 5 are schematic views of other instrumentation systems of the invention;

FIG. 6 is a wave-form diagram for the system of FIG. 5;

FIG. 7 is a schematic view of another instrumentation system of the invention;

FIG. 8 is an equivalent circuit diagram for FIG. 7; and

FIG. 9 is a schematic view of another instrumentation system of the invention.

MEASURING STATIONS AND INFORMATION GATHERING SYSTEMS

Some of the measuring processes described above require that samples be extracted from the equiduct. For such purposes, sampling stations can be included at various locations along the equiduct. Automatic sample-taking devices can be utilized for taking such samples at predetermined time intervals. Most of the measurements discussed above, however, can be utilized to give rise to electrical outputs which can be telemetered to a remote monitoring station. Because of the physical length which is expected for certain classes of equiduct systems, some consideration should be given to the propagation delays in the transmission of electrical signals from remote telemetry points to a data collection station. For example, when the entire system has a length of approximately 300 miles from the most remote telemetry station to the gathering station, the time delay associated with the propagation of an electrical signal over the distance is thousands of times greater than the time required for processing one binary digit of information as part of such a transmission. In an extended system with such long delays compared to the time required for transmission of a binary digit of information, a mode of information gathering different from querying each station individually can be desirable.

One mode of operation which offers a high rate at which information is received at the gathering station can be implemented by placing a suitable timing circuit or clock at the far end or ends of the system, remote from the gathering station. This clock or clocks then emit short bursts of binary digits which are transmitted through the system, telling what time it is. As these bursts pass successive stations, each recognizes a time slot which is assigned to it. It then inserts into an unused brief transmission time in the information transmission system the information which it is to contribute. As the timing pulses move down the length of the system, each separate station contributes its piece of information, so that the transmission starts out near the clock end with relatively few stations having contributed their information and arrives at the central receiving station with all of the stations having filled in their appropriate blank spots in the transmission sequence. In this way, the receiving station can receive information at a rate which is limited by the rate at which incoming information can be carried by the information transmission system, and is relatively independent of the time delays associated with the propagation of information from remote stations to the receiving station.

When there are several branches of a system feeding information over long distances by different routes to a central station, each can be equipped with its own clock at its extreme end from the central station. The central station then can have suitable buffers to store the information received and pass it on to the central processing system at appropriate times.

A. OVERALL SYSTEM

FIG. 1 is a schematic diagram of a system such as that described above in this Section V. The system includes a clock source C which transmits a series of timing words 5, 7, and 9, with gaps 6, 8, etc., between them. The timing word 5 and the subsequent gap 6 together form a digital word 2. Timing word 7 and the subsequent gap 8 form another word 3. Timing word 9 and the subsequent gap form the word 4, etc. These signals flow through the system in the direction designated by the arrow 10. The dashed line 31 indicates a local sensing, information processing, and telemetry station. This station has one or more sensors, here shown specifically as two sensors, 14 and 16. Each feeds its respective signal processing circuit, which conditions the signal for transmission. Sensor 14 feeds a signal into a data processor 13 in the direction of the arrow 19. Sensor 16 feeds a signal in the direction of arrow 21 into a data processor 15. Processors 13 and 15 feed their outputs, respectively, in the directions of arrows 20 and 22 to a transmitter 12.

Coded information entering in the transmission channel is sampled and sent in the direction of the arrow 17 to a receiver 11, which recognizes its particular code word, for which it has been set, corresponding to a particular timing. It feeds a recognition impulse in the direction of arrow 18 to the transmitter 12, causing the transmitter to transmit the information which it has received from the various sensors through their various signal conditioning units. The information transmitted flows in the direction of the arrow 23. The result is a new digital word 25. The recognition circuit in the receiver 11 was set to recognize the timing word 5, causing the blank 6 to be filled in with an information word 24. The next word, 26, corresponds to the word 3, and contains the timing code word 7 and the blank 8. Only the blank space following immediately after the timing code word for which the receiver was set is filled with an information word.

This enriched stream of information proceeds in the direction of arrow 28 to other local stations 31 like the one just described, in which further information is added. Thus, a closely-packed stream of information is delivered over a line 29 to a central processor 30.

B. SENSOR STATION

FIG. 2 is a schematic diagram showing a representative instrumentation station on a section of equiduct 32. At a location 78 five transducers, 33, 34, 35, 36, and 37 are spaced around the equiduct. Each transducer includes a set of strain gauges for measuring deformations in the surface of the equiduct 32.

FIG. 3 is an enlarged and more detailed drawing of one such transducer 33. The transducers 34–37 are identical to transducer 33. The transducer 33 includes strain gauges 64, 65, 66 and 67, which are mounted upon an adhesive pad 63 which is secured to the outside wall of the equiduct 32. Electrical outputs from these strain gauges are delivered to a cable 68. The various strain gauges are oriented so as to be sensitive to different components of the strain. Each is sensitive to the projection of the strain along the axis shown on each strain gauge by a suitably oriented arrow. Strain gauge 65 is oriented essentially perpendicularly to the longitudinal axis of the equiduct 32 and measures transverse strain in the equiduct. Strain gauge 66 is oriented essentially parallel to the longitudinal axis of the equiduct 32 and measures axial deformation. The axes of strain gauges 64 and 67 are aligned at 45° angles 73 and 74, respectively, to the axis of strain gauge 66. Thus, these strain gauges 64 and 67 are located on a bias with respect to equiduct 32 and are especially useful for sensing torsion in the equiduct wall. Additionally, they can be helpful in sensing the displacement of one portion of the equiduct relative to another portion axially spaced therefrom, without necessarily any change in the cross-section of each such portion, as would be characteristic of a "snaking" mode of deformation of the equiduct. Strain gauge 65 is particularly useful for observing the passage of a surface wave characterized by changes in diameter of the equiduct. Additionally, because flexing of the equiduct wall in a transverse direction tends to change the amount of strain appearing at its surface, strain gauge 65 would also be sensitive to higher modes of surface waves. See my co-pending patent application *2.

An optional accelerometer 76, with output through cable 77, is incorporated in the transducer station 33.

Referring again to FIG. 2, the transducers 33 through 37 deliver their information in the directions shown by arrows 38, 39, and 40 to the local data telemetering equipment 31 which is shown in FIG. 1. Within equiduct 32, a fluid is flowing in the direction of arrow 41.

A sampling port 42 in the conduit wall allows a portion of the fluid to flow through a tube 43 into a sampling station instrumentation package 44. Such instrumentation package could contain, for example, a sequential sampling mechanism for obtaining and preserving samples of the contents of the equiduct at preselected times. Also, it could contain any desired batch-processing chemical and analytic equipment. Information flows from station 44, in the direction shown by arrow 45, to the telemetering equipment 31.

Unit 46, which is located within the equiduct 32, could be used for various types of monitoring processes which are made relatively more simple by their inclusion within the flowing liquid. For example, at station 46 might be included a flow-meter. Such a flow meter could comprise a suitably-designed blade which is rotated or deflected by the passage of fluid within equiduct 32, or a magnetic induction flow meter, etc. Other types of measurement, such as the measurement of turbidity, might also advantageously be performed by an instrument located at the station 46 inside of the equiduct so as to avoid the transport of a slurry or other inhomogeneous material outside of the equiduct through passages in which debris might gather.

Fluid flows out of the equiduct 32 through a tube 54, in the direction of arrow 49, to an analytic station 50. The fluid returns to the equiduct in the direction of arrow 52 through a tube 55, to re-enter equiduct 32 at location 53. Within the analytic station 50 are located instruments which continuously monitor properties of the equiduct contents, but which do not require location within the equiduct. For example, various specific ion electrodes for sensing ionic concentrations in the equiduct might be included at station 50. Electrodes useful for measuring the pH, or the oxygen partial pressure within equiduct 32, might also be included at station 50. In general, instruments in station 50 can reject material after analyses have been performed in a continuous fashion, or in a batch fashion, through tube 55 without interfering with the intake of material at inlet 48. Information obtained from instruments at station 50 passes in the direction of arrow 51 into the telemetering system 31.

A cable 57 carries information in the direction of arrow 56 from preceding local stations to the telemetering station 31. Information progresses from station 31 through cable 59 in the direction of arrow 60. It is evident, of course, that information will not be input to station 31 through cable 57 if the station 31 is at the end of the equiduct system. In the latter case, however, the station 31 will include a clock source C as shown in FIG. 1. Also, station 31 can operate independently of other stations, and generate a suitable information output without requiring an information input. As is discussed in connection with FIG. 1, utilization of progressively timed delivery of information into an information gathering station can be a useful way to increase the density in time of information arriving at a central processor which receives information from a physically extensive system.

C. SURFACE WAVE MEASUREMENTS

FIG. 4 shows schematically an equiduct 62, instrumented by two stations, 79 and 80, each with strain gauges and, optionally, accelerometers. The stations 79 and 80 are spaced from each other. Information flows from station 79 in the direction of arrow 84 to a data processor 82, and from station 80, in the direction of arrow 81, to the data processor 82. The deformation caused by a surface wave propagating in the direction of arrow 86 will be detected first by strain gauges at station 79, and subsequently by strain gauges at station 80. Processor 82 can compare such detected deformations, and extract from them information concerning the velocity of propagation and amplitude properties of the surface wave. A measure of the amplitude of the surface wave at station 79 and of its amplitude at station 80 can indicate whether the surface wave is descreasing or increasing in amplitude as it propagates. The velocity and direction of propagation is extracted separately by the timing between successive detections of the wave. If, for example, a surface wave were detected first at station 80, and then at station 79, it would be propagating in a direction opposite to arrow 86. If it is propagating in the direction of arrow 86, and if it has a larger amplitude at station 79 than at station 80, then it is being attenuated as it progresses along equiduct 62. If it is detected first at station 79 and subsequently at station 80, and has higher amplitude at station 80 than at station 79, then it is increasing in amplitude and presumably is being amplified as it progresses along equiduct 32. The two stations are spaced a known distance 85 apart. The difference between the times of arrival of a wave at the two stations is equal to this distance divided by the velocity of propagation. Note that the velocity of propagation of different frequency components of the surface wave and of different modes of the surface wave may not necessarily be the same. For more discussion of this point, see my co-pending patent application *2. Information from processor 82 progresses in the direction of arrow 83 to the local station 31, which was discussed in connection with FIG. 2.

At station 201 in FIG. 4 there is shown a device for exciting waves in the surface of equiduct 62. This device includes an anchoring ring 207 with transducers 202, 203, 204, 205, and 206, to apply radial, longitudinal and/or transverse forces to move the surface of the equiduct in a manner such as to generate surface waves as described in my co-pending patent application *2. These transducers are driven by impulses flowing in a cable 210 in the direction of arrow 209 from a signal generator 208. Referring to FIG. 3, in every direction in which a strain gauge is oriented in instrumentation station 75, one could orient a mechanical excitation means. In this way, in a complementary sense, the detection of the passage of a surface wave and the generation of a surface wave are quite similar. Each represents a flow of mechanical energy into a sensing system or out of a signal generating system. A signal sensing system is typically designed so as to minimize its effect upon the system being measured. In the case of a transducer, the opposite is true. Strong coupling between the transducer and the medium being excited is typically desirable for effective driving of the load.

D. LEAK AND DISCONTINUITY DETECTION

FIG. 5 shows schematically a method and apparatus for locating leaks within the wall of section 75 of equiduct which carries adequately conductive fluid 111, and is located in an adequately conductive medium 110. Although the walls of the conduits 32 and 62 shown in FIGS. 2 through 4 can be of any material described in my co-pending patent application *2, the walls 108 of the equiduct section 75 are made of dielectric material.

Leaks in the wall 108 are shown at locations 112 and 113. The leakage paths at those locations allow electrical contact between the fluids 110 and 111 internal to and external to the wall of equiduct 75. A pulse generator 100 delivers a characeristic output pulse 101 which propagates in the direction of arrow 102 through coaxial cable 103. Coaxial cable 103 has inner conductor 104 and outer conductive sheath 105. This coaxial cable enters equiduct 75 and makes electrical contact with its internal fluid 111 at location 106. If adequate conductive contact is not provided elsewhere along cable 103, conductive contact 90 on the outside of the equiduct wall can be provided for electrical connection with the ambient medium 110. The pulse 101 propagates along equiduct 75, where the fluid 111 contained within the equiduct and the fluid 110 outside the equiduct act as the inner and outer members, respectively, of a coaxial cable. The outer surface 107 of inner fluid 111, and the inner surface 109 of surrounding medium 110 are the surfaces which define the geometric limits of the respective conductors. Dielectric material 108 of the wall serves as the dielectric separating these two conductors.

When the pulse 101 reaches the leak 112, a portion of the pulse is reflected. This is the consequence of the leak 112 being an impedence mismatch, locally, within the coaxial conductive system formed by the fluids and dielectric wall associated with equiduct 75. Presumably, the bulk of the electro-magnetic energy continues in the direction of arrow 158, where it passes leak 113, and again a small amount of it is reflected back. The reflected energy from electrical leaks 112 and 113 propagates in the direction of arrow 159, and a portion of it passes again through coaxial cable 103, this time in the direction of arrow 114.

Portions of both the transmitted energy and the reflected energy pass through a limiting circuit 115. Limiting circuit 115 can be a simple known diode limiting circuit, or it can consist of a transmit and receive switch of a type familiar in radar. The signal then progresses through connection 118 in the direction of arrow 117 to an electronic data processor 116. Analyzed information then progresses in the direction of arrow 87 to suitable electronics, such as, for example, that of the station 31 discussed in greater detail in connection with FIG. 1.

In FIG. 6 is shown diagrammatically a representative electronic wave-form such as might be found at station 118 in FIG. 5. Axis 121 represents amplitude; axis 122 represents time. 126 is a pulse corresponding to pulse 101 after it has been limited to amplitude 129 by circuit 115. This occurs at a time T123. Some time later, the reflected impulse from leak 112 is returned and observed. This is labeled 127 and occurs at the time T124, with amplitude 130. Some time after that the reflected impulse from leak 113 is observed. Here it is depicted as pulse 128, occurring at time T125 with amplitude 131. The amplitude of the returned pulse 127 or 128 gives an indication of the amount of electrical connection present between fluid 111 and medium 110. The larger this pulse, the larger the amount of electrical conductivity between the two. Note that pulses 127 and 128 are inverted with respect to pulse 126. This is a consequence of reflection of the impulse from a discontinuity in the impedance of the coaxial cable having a lower characteristic impedance than that of the undisturbed cable. The velocity of propagation of the electromagnetic pulse along coaxial conductor system 111, 108 and 110 can be calculated from the properties of the media 111 and 110, and of dielectric 108. With this velocity of propagation known, knowing the time delays between time of arrival T124 or T125 and time of emission T123 for the reflected pulses 127 and 128 to return as echoes from the transmission of initial pulse 126, one can calculate the distances 119 and 120 (see FIG. 5), respectively, to impedance discontinuities caused by the leaks 112 and 113.

Discontinuities in the wall 108, such as the indentation shown at 91, also can give rise to a variation in impedance, a reflection of electromagnetic energy, and a corresponding impulse. This is depicted by pulse 138 with amplitude 137 and time of detection T136.

One significant characteristic of this method of detecting leaks and imperfections of the wall of an equiduct is that the presence of one such irregularity or leak does not necessarily interfere with the detection of another at a different location. For example, an accumulation of debris with different conductivity properties and dielectric properties from the fluid medium 111 within equiduct 75 can give rise also to the reflection of electromagnetic impulses. FIG. 5 shows such an accumulation 92 of debris on the inner wall of equiduct 75. Presence of such debris constitutes a deformation of the outer surface of inner conductive medium 111. This results in a change in the geometry of the coaxial conductive system, and thus a change in its impedance in that region. This change can give rise to the reflection of electromagnetic energy.

Here the dielectric wall 108 is shown as having been thickened by debris 92. We will presume that the material comprising the thickening debris is a dielectric, and that it has poor electrical conductivity. This means that, effectively, dielectric wall 108 is thicker. The polarity of an impulse reflected from an increased impedance occurring relatively abruptly within a transmission line, or transmission system such as this coaxial conductor system, is the same as the impulse arriving at the region in which the reflection occurs. Thus impulse 139 (FIG. 6), corresponding to this reflection arrives with positive amplitude 141 relative to initial impulse 126. Its time of arrival, T140 together with information as to the velocity of propagation of the electromagnetic impulses within equiduct 32, can be used to determine the location of the mass 92 of debris.

Debris with a significant magnetic permeability also can produce a reflection. Often, debris will have either dielectric properties or magnetic properties different from the internal fluid 111. Such properties may, under suitable circumstances, allow detection of debris within the equiduct by reflection of electromagnetic impulse energy transmitted from a station located at a substantial distance from such debris. This could, under suitable circumstances, allow a fairly extended region of equiduct to be monitored for faults, deformations of the wall which might represent a substantial weakening, leaks, and accumulation of debris, without requiring a large number of monitoring stations.

FIG. 7 shows a portion of an equiduct 155. In this section of equiduct 155, direct current or low frequency instruments are used to detect the presence of leaks such as the leak 112. Internal medium 111 and external medium 110 are presumed to be adequately electrically conductive. Power supplies 148 and 149 establish a potential difference between electrodes 144 and 145 connected to the fluid 111 within equiduct 155. The equiduct wall is electrically insulating. Current flows through the fluid 111 between electrodes 144 and 145 in a direction designated by arrows 142 and 143. At the leak 112 current can pass into and out of the equiduct. The latter current flow, entering or leaving, is designated by arrow 140.

An electrode 153 is in electrical contact with the fluid 110 surrounding equiduct 155 and has a potential V153. The voltage at electrode 144 is V144; that at electrode 145 is V145. Comparator 151 compares the voltages V153 and V150 at electrode 153 and at the node 150 between power supplies 148 and 149.

One mode of operation is to adjust power supplies 148 and 149 so that their total voltage is greater than zero, and the ratio between them is such that the voltages V150 and V153 are equal. Comparator 151 can be used in a simple feedback loop to control this process. What happens physically, corresponding to this, is that the current passing through leak 112 is made to be nearly zero. Current flowing between electrodes 144 and 145 is in the direction of arrows 142 and 143, and establishes a voltage gradient along the length of equiduct 155. The leak 112 can be thought of as the sliding contact of a potentiometer, making contact between external medium 110 and internal medium 111 at some location with a corresponding potential. The location along the length of the equiduct is represented by the quantity X. The potential is a function of X, and is represented as V(X).

The leakage path through leak 112 and through the surrounding medium 110 may have a resistance which is not easily controlled and whose value is not known at any particular time. For this reason, it is desirable to reduce the current flowing through this path to a very small value so as to essentially eliminate the effect of fluctuations in the resistance of this path.

FIG. 8 is an equivalent circuit diagram for the current flow path in FIG. 7. R160 represents the resistance to the flow of electricity of the fluid 111 within equiduct 155. R161 represents the combined resistance to flow of electricity of leak 112 and surrounding medium 110 which connects to electrode 153. 151, 148 and 149 are, respectively, the comparator and two power supplies of FIG. 7. By adjusting the power supplies 149 and 148 so that there is no voltage difference across comparator 151, one produces a voltage ratio between the power supplies which is equal to the ratio R162/R163 of the two sections of the potentiometer resistance R160. Assuming that equiduct 155 has uniform cross-section, then this ratio R162/R163 is proportional to the ratio of the distances 164 and 165 between the leak 112 and the electrodes 144 and 145, respectively (FIG. 7). Thus, the ratio of the voltages V166 and V167 produced by power supplies 148 and 149, is the same as the ratio of resistances R162 and R163 and, therefore, the ratio of distances 164 and 165. A single isolated leak may thus be located in an equiduct having suitably insulating walls an containing and surrounded by suitably conductive media.

Electrical leak detection methods can, of course, be used in conjunction with other leak detection methods such as chemical tracers. The electrical method has the advantage of readily roughly locating certain types of leaks in certain types of equiducts, so that a more accurate location, for example by local electrical sensors or leak detectors of a chemical type brought to the general region can readily pinpoint the leak.

FIG. 9 shows a system for measuring the amount of buoyancy of a portion of equiduct 190 and its contents 187. This portion of equiduct is submersed in a fluid 185, below its surface 186, and is anchored by cables 192 and 193 to weights 182 and 183 resting on the bottom 184 of the river or other body of water in which it is located. Belts 180 and 181 are used to distribute the force from cables 192 and 193.

Connected in cables 192 and 193 are force transducers 188 and 189, respectively. Each transducer 188 and 189 produces an electrical output signal which is a function of the tensile force in the cable. The transducers 188 and 189 deliver their output signals to the local telemetering equipment 31 for processing as described above.

In accordance with methods described in detail in my co-pending patent application *2, equiduct 190 is constructed so as to have net positive buoyancy under all anticipated circumstances when surrounded by the fluid medium 185 and containing the fluid 187. Fluid 187 might be an inhomogeneous material, such as a slurry whose density might be relatively difficult to measure if measurement were made on a small portion of the fluid from within the equiduct. Under such circumstances, a relatively large scale measurement can give a higher accuracy, and can do so with relatively little complication. Measurements of this type might, for example, be useful in a control loop used to control the amount of liquid added to a slurry, so as to control the density of the slurry in order to allow equiducts located further downstream in the system to be operated at essentially neutral buoyancy. This might be advantageous, for example, where an equiduct system is utilized for transporting solid wastes far out to sea from the outlet of the mouth of a river on a seacoast. Under such circumstances it might be desirable to reduce the forces acting upon the equiduct, and have the equiduct located neither upon the bottom nor at the surface of the body of water containing it. Under the circumstances, as are discussed in my co-pending patent application *2, it can be highly advantageous to operate an equiduct with essentially neutral buoyancy.

Various types of instrumentation are useful in various types of equiduct systems. Under some circumstances instrumentation is desirable as part of the operating equipment of the equiduct system. For example, if the equiduct uses flow augmentation means, measurements of pressure are appropriate to monitoring and controlling the performance of flow augmentation devices. If the equiduct is used to transport inhomogeneous materials such as slurries of solid matter in liquid, measurements of the accretion of debris at portions of the equiduct can be valuable for controlling the velocity of flow of material through the equiduct so as to avoid such accumulation of debris. In a flow augmented equiduct system, an excessive velocity of flow could have associated with it an excessive consumption of power. Thus, monitoring sedimentation of debris within the equiduct could be a useful measurement in a control loop whose function was to maintain the operation of the equiduct system at the lowest power consumption level compatible with transport of the slurry in question.

Measurements of the presence of trace chemicals within the equiduct can be desirable as part of an operating measurement to control the addition of suitable corrective chemicals, for example, chemicals which might be used for removing from solution toxic metal ions. These could be added to the equiduct, and the mixing and flow of fluids within the equiduct used to promote adequate mixing and thorough interaction of the additives with the material transported.

In general, the equiducts can be used as mixing and reacting vessels for a wide variety of chemical reactions between additives and the material transported, or between biologically active ingredients, such a biological cultures, added to the material and nutrients or other substances present within the equiduct. Because such a wide variety of uses of the equiduct appear feasible, a wide variety of types of chemical and biological instrumentation could then become appropriate as sensing elements in control loops controlling such activities and processes. In an equiduct system using flow augmentation means, measurements of the velocity of propagation of surface waves of various types can be significant for determining operating points which lie within a safe operating region of many parameters, and tend to minimize the consumption of power. What might be regarded as research measurements for one class of applications might be preventive maintenance for another, and operating control measurements for yet another.

VI. SUMMARY

In this patent application I have set forth various ways in which instrumentation of equiducts may be satisfactorily achieved. This instrumentation can be used, for example, in implementing control loops, in monitoring performance for maintenance or other purposes, and for pursuing detailed research into the performance and nature of equiducts. These instruments can be advantageously utilized in conjunction with the various control and monitoring functions set forth in my co-pending patent applications *1, *2, *4, and *5. Combinations of and variations on these measuring and control processes and methods and apparatus may be performed without departing from the scope of the invention as set forth herein. In general, the above description of the invention is intended to be illustrative and not limiting. Various changes or modifications in the embodiments described may occur to those skilled in the art and these can be made without departing from the spirit or scope of the invention.

I claim:

1. In an elongated data transmission system having a plurality of measurement stations spaced along a transmission line, a monitoring station, means for communicating along said transmission line data collected at said measurement stations, means for inserting measurement information from each of said measurement stations into said transmission line, and means in said monitoring station for receiving said information, wherein the transmission line has a speed of propagation and a length such that the delay time to said monitoring station from the most remote of said measurement stations is significantly longer than the time required for each measurement information inserting means to insert said information into said transmission line; the improvement wherein said communicating means includes a sampling signal source for applying repetitive sampling signal bursts to said transmission line to travel past said measurement stations toward said monitoring station, each burst including a plurality of code-identified blank intervals, and means at each measurement station for detecting a selected one of said blank intervals in accordance with said code; each said information measurement inserting means being operative to insert at least a portion of said information into the respective said one blank interval, such that the sampling rate at which said measuring stations can insert data and at which the monitoring station can receive said information from said measurement stations does not depend on the distance along said transmission but instead depends on the rate of repetition of the code-identified blank intervals of said sampling signal.

2. A system as in claim 1 including an equiduct system, said transmission line extending along said equiduct system, said measurement stations being positioned along said equiduct system to measure the parameters thereof.

3. A system as in claim 1 in which each of said bursts include a plurality of coded signals followed by said blank intervals, and means for repeating the bursts in a pre-determined sequence thereby repetitively sampling the data at said measurement stations.

4. A system as in claim 2 in which said measurement information is selected from the group consisting of measurements of equiduct depth, pressure across equiduct wall, fluid velocity, gas traction in fluid, gas composition, liquid composition stress or strain in equiduct wall, wall defects, leakage, surface waves, wall fatigue, pressure drop across pump, pump power operating temperatures, duct wall thickness, fluid density, and viscosity.

5. In combination, an equiduct system including at least one elongated conduit with a thin elastic wall submerged in a liquid and carrying a liquid in fluid equilibrium with the first-named liquid, strain gage means on the wall of said conduit for detecting the difference between the pressures inside and outside said conduit, and an elongated data transmission system having a plurality of measurement stations spaced along a transmission line, a monitoring station, means for communicating along said transmission line data collected at said measurement stations, means for inserting measurement information from each of said measurement stations into said transmission line, and means in said monitoring station for receiving said information, wherein the transmission line has a speed of propagation and a length such that the delay time to said monitoring station from the most remote of said measurement stations is significantly longer than the time required for each measurement information inserting means to insert said information into said transmission line; the improvement wherein said communicating means includes a source of repetitive sampling signal bursts, each burst including a plurality of code-identified blank intervals, and means at each measurement station for detecting a selected one of said blank intervals in accordance with said code; each said information measurement inserting means being operative to insert at least a portion of said information into the respective said one blank interval, such that the sampling rate at which said measuring stations can insert data and at which the monitoring station can receive said information from said measurement stations does not depend on the distance along said transmission line to said measurement stations but instead depends on the rate of repetition of the code-identified blank intervals of said sampling signal; wherein said strain gage means includes means supplying the detected pressure difference to an associated one of said measurement information inserting means.

6. A device as in claim 5 in which said strain gage means includes a strain gage aligned to detect circumferential strain in said wall.

7. A device as in claim 5 in which said strain gage means includes a strain gage aligned to detect longitudinal strain in said wall.

8. A device as in claim 5 in which said strain gage means includes separate strain gages arranged, respectively, longitudinally, circumferentially, and at 45° to the longitudinal axis of said conduit.

9. In an equiduct system including at least one elongated conduit with a thin elastic wall submerged in a liquid and carrying a liquid in fluid equilibrium with the first-named liquid, said wall being made of electrically insulating material, the improvement comprising an electrical potentiometer circuit including spaced electrical contacts contacting the liquid in said conduit and forming two electrodes of a potentiometer, the liquid impedances between a leak in the conduit wall and said contacts forming two resistances of said potentiometer, means for applying a voltage to said potentiometer and detecting the ratio of the voltages across said resistances to represent the distances of said contact from said leak, and an elongated data transmission system having a plurality of measurement stations spaced along a transmission line, a monitoring station, means for communicating along said transmission line data collected at said measurement stations, means for inserting measurement information from each of said measurement stations into said transmission line, and means in said monitoring station for receiving said information, wherein the transmission line has a speed of propagation and a length such that the delay time to said monitoring station from the most remote of said measurement stations is significantly longer than the time required for each measurement information inserting means to insert said information; the improvement wherein said communicating means includes a sampling signal source for applying repetitive sampling signal bursts to said transmission line to travel past said measurement stations towards, each burst including a plurality of code-identified blank intervals, and means at each measurement station for detecting a selected one of said blank intervals in accordance with said code; each said information measurement inserting means being operative to insert at least a portion of said information into the respective said one blank interval, such that the sampling rate at which said measuring stations can insert data and at which the monitoring station can receive successive elements of said information from said measurement stations does not depend on the distance along said transmission line to said measurement stations but instead depends on the rate of repetition of the code-identified blank intervals of said sampling signal; wherein said means applying voltage and detecting the voltage ratio includes means supplying information, representing the distances from said leak, to an associated one of said measurement information inserting means.

10. A system as in claim 9 in which said resistances are connected as two arms of a bridge circuit, and a comparator for comparing the voltage between said leak and the bridge node opposite thereto.

11. A method employing an elongated data transmission system for measuring the pressure difference between the inside and outside of a equiduct, the elongated data transmission system having a plurality of measurement stations spaced along a transmission line, a monitoring station, means for communicating along said transmission line data collected at said measurement stations, means for inserting measurement information from each of said measurement stations into said transmission line, and means in said monitoring station for receiving said information, wherein the transmission line has a speed of propagation and a length such that the delay time to said monitoring station from the most remote of said measurement stations is significantly longer than the time required for each measurement information inserting means to insert said information into said transmission line; wherein said communicating means includes a sampling signal source of for applying repetitive sampling signal bursts to said transmission line to travel past said measurement stations, each burst including a plurality of code-identified blank intervals, and means at each measurement station for detecting a selected one of said blank intervals in accordance with said code; each said information measurement inserting means being operative to insert a least a portion of said information into the respective said one blank interval, such that the sampling rate at which said measuring stations can insert data and at which the monitoring station can receive successive elements of said information from said measurement stations does not depend on the distance along said transmission line to said measurement stations but instead depends on the rate of repetition of the code-identified blank intervals of said sampling signal; said method comprising measuring the strain in the equiduct wall converting the resulting strain measurement to a pressure measurement, and supplying said pressure measurement to a respective one of said measurement information inserting means of said elongated data transmission system.

12. A method of measuring traveling waves in equiducts, said method comprising performing a pressure measurement as in claim 11, and detecting at least a longitudinal component of said strain.

* * * * *